J. MOTT.
CATTLE TIE.
APPLICATION FILED JULY 18, 1921.
1,408,764.
Patented Mar. 7, 1922.
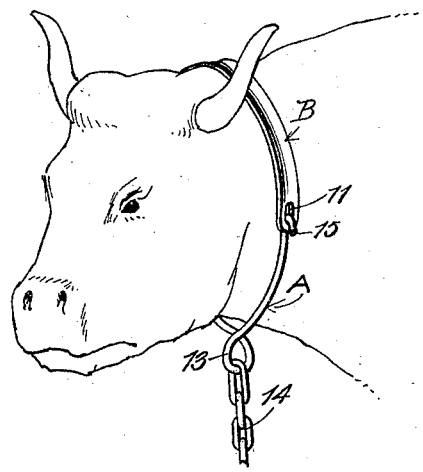
Fig.1.
Fig.2.
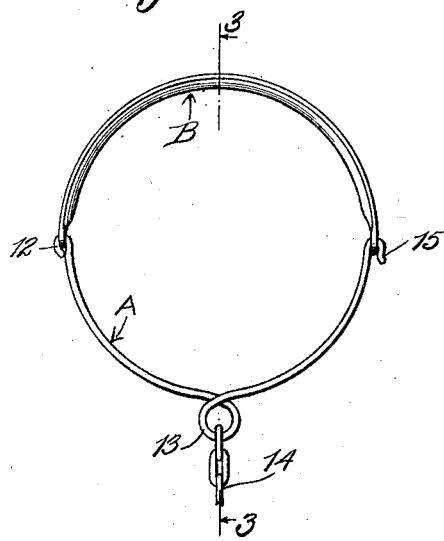
Fig.3.
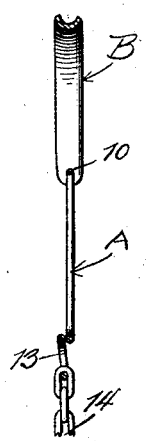
Inventor
John Mott
By
J. Beau Kelly, Attorney

UNITED STATES PATENT OFFICE.

JOHN MOTT, OF DAZEY, NORTH DAKOTA.

CATTLE TIE.

1,408,764.  Specification of Letters Patent.  Patented Mar. 7, 1922.

Application filed July 18, 1921. Serial No. 485,517.

*To all whom it may concern:*

Be it known that I, JOHN MOTT, citizen of the United States, residing at Dazy, in the county of Barnes and State of North Dakota, have invented certain new and useful Improvements in Cattle Ties, of which the following is a specification.

This invention relates to improvements in cattle ties and more particularly to a ring or collar to be placed about the neck of the animal which has facilities for easy and quick removal or replacement and for connection with a chain or other tying element.

The main object of the invention is to provide a ring or collar to be arranged about the neck of the animal which is made in substantially two parts hinged with respect to each other, one part having a twisted or loop portion capable of receiving a link of a chain without cutting or providing a special link for that purpose, and wherein the detachable ends of the hinged part are so constructed whereby they may be locked together without necessitating the employment of additional means.

A further object of the invention is to provide a device of the above character that is simple in construction, strong and durable and which it is believed may be manufactured at a low cost.

Various other objects and advantages of my invention will become apparent during the continuance of the following description.

In the drawings:—

Figure 1 is a view in perspective showing my invention in its preferred embodiment and as arranged about the neck of an animal.

Figure 2 is a view in front elevation, and,

Figure 3 is a view in transverse cross section taken on line 3—3 of Figure 2.

In reducing my invention to practice, I provide a novel device consisting of substantially two parts, A and B, respectively, the part B hereinafter referred to as the upper part consisting of a length of material bent longitudinally in substantially the arc of a circle and transversely in substantially the same manner in order to fit snugly about the upper part of the neck of an animal and to prevent injury by its longitudinal edges. At one end, the part B is provided with a small opening 10 that receives one end of the lower part A as will be hereinafter described and adjacent its other end is provided with an elongated slot 11 for the purpose that will presently appear.

The member A which will be hereinafter referred to as the lower member consists of a length of heavy wire or similar material which has one end positioned through the opening 10 in the adjacent end of the upper member and bent into the form shown at 12 whereby the lower member will be held in hinged relation to the upper member as clearly shown in Figure 2. Intermediate its ends, the lower member is twisted to form a depending eye 13 that receives a link of the securing chain 14 in the manner hereinafter described while at its other end it is bent to form a hook portion 15 that is adapted to be positioned through the elongated slot 11 of the upper member so as to lock the upper and lower members together as shown in Figure 2. The free end of the hook 15 is curved slightly as shown in Figure 2 whereby when the hook assumes a locking position as shown in Figures 1 and 2 it will be yieldingly held against upward movement with respect to the upper member B.

When the members A and B are in open relation a link of the chain 14 may be passed over the hook 15 and moved downwardly on the member A until it finally assumes the position on the eye or loop 13. Thus it will be observed that after the members A and B have been locked together about the neck of the animal, the possibility of the chain 14 becoming disconnected from the lower member is eliminated. Moreover it will be observed that by reason of this particular construction, a snap link does not have to be provided nor does the end link of the chain have to be cut or modified in any way.

From the foregoing it is believed that the advantages and novel features of my invention will be readily understood and therefore further detailed description is deemed unnecessary.

What is claimed is:—

In a device of the character described, comprising upper and lower semi-circular members hingedly connected at one end, the other end of said upper member being provided with an elongated slot, a hook formed at the opposite end of said lower member adapted to pass through said elongated slot to detachably connect one end of said upper and lower members, and an eye or loop formed intermediate the ends of said lower member adapted to receive a link of a chain by passing the link over the detachable end of said lower member when said upper and lower members are in open relation substantially as described.

In testimony whereof I affix my signature.

JOHN MOTT.